(12) United States Patent
Okuno

(10) Patent No.: US 6,982,823 B2
(45) Date of Patent: Jan. 3, 2006

(54) WAVELENGTH CONVERTER

(75) Inventor: Toshiaki Okuno, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 237 days.

(21) Appl. No.: 10/651,253

(22) Filed: Aug. 29, 2003

(65) Prior Publication Data
US 2004/0105615 A1 Jun. 3, 2004

(30) Foreign Application Priority Data
Aug. 29, 2002 (JP) .............................. 2002-251627

(51) Int. Cl.
*G02F 1/365* (2006.01)
(52) U.S. Cl. ...................................... 359/332; 359/326
(58) Field of Classification Search ........ 359/326–332; 372/21–22
See application file for complete search history.

(56) References Cited

U.S. PATENT DOCUMENTS

| 6,301,273 | B1 | 10/2001 | Sanders et al. | |
|---|---|---|---|---|
| 6,330,104 | B1 | 12/2001 | Kim et al | |
| 6,501,591 | B1 * | 12/2002 | Kumar et al. | 359/330 |
| 6,529,314 | B1 * | 3/2003 | Shukunami et al. | 359/332 |
| 6,661,958 | B2 * | 12/2003 | Hirano et al. | 385/127 |
| 6,763,042 | B2 * | 7/2004 | Williams et al. | 372/6 |

FOREIGN PATENT DOCUMENTS

| EP | 0 730 191 A2 | 9/1996 |
|---|---|---|
| EP | 0 981 189 A2 | 2/2000 |
| EP | 1 209 497 A2 | 5/2002 |
| JP | P2001-42368 | 2/2001 |

OTHER PUBLICATIONS

E. M. Dianov et al., "CW High Power 1.24 μm and 1.48 μm Raman Lasers Based on Low Loss Phosphosilicate Fibre", Electronics Letters Aug. 28th, 1997 vol. 33, No. 18, pp. 1542-1544.

* cited by examiner

*Primary Examiner*—John D. Lee
(74) *Attorney, Agent, or Firm*—McDermott Will & Emery LLP

(57) ABSTRACT

Provided is a wavelength converter that makes it possible to improve the S/N ratio of output signal light. In the wavelength converter, optical pump light $\lambda_3$ output from an optical pump source passes through a first reflector and travels through an optical fiber. Light having wavelengths that differ from the aforementioned wavelength is generated by a nonlinear optical phenomenon at the optical fiber. Of the light, generated light $\lambda_4$ having a resonant wavelength of a resonator is optically amplified and oscillated. An input signal $\lambda_1$ also passes through the first reflector and travels through the optical fiber. At the optical fiber, an output signal light $\lambda_2$ having a different wavelength is generated by a nonlinear optical phenomenon between the generated light $\lambda_4$ and the input signal light $\lambda_1$. The output signal light $\lambda_2$ passes through a second reflector and is output from a resonator.

17 Claims, 6 Drawing Sheets

US 6,982,823 B2

WAVELENGTH CONVERTER

BACKGROUND OF THE INVENTION

1. Field of the Invention

The present invention relates to a wavelength converter which receives signal light having a first wavelength and generates and outputs signal light having a second wavelength and carrying the same information as the received signal light.

2. Description of the Related Art

A wavelength converter receives signal light having a first wavelength and generates and outputs signal light having a second wavelength and carrying the same information as the signal light having the first wavelength. A wavelength converter is, for example, disposed at a node of an optical transmission network where a plurality of nodes are connected to each other by a network of optical fiber transmission lines, and converts a wavelength of input signal light that has reached the node and output the signal light whose wavelength has been converted as output signal light.

For example, a wavelength converter, disclosed in Japanese Patent Application Publication No. 2001-42368, comprises a semiconductor optical amplifier and a resonator. In the wavelength converter, a part of spontaneous emission from the semiconductor optical amplifier resonates in the resonator and acts as optical pump light, while input signal light is introduced into the resonator from the outside. The optical pump light and the input signal light interact with each other in the semiconductor optical amplifier, which is a wavelength converting medium, to generate output signal light, which is output from the resonator.

However, the wavelength converter, which makes use of spontaneous emission from the semiconductor optical amplifier such that the wavelength region of the emitted spontaneous emission and the wavelength region of the output signal light overlap, is inferior in terms of signal-to-noise (S/N) ratio of the output signal light. In addition, it has a disadvantage in that the available wavelength region of the output signal light cannot be wide since the usable wavelength region is determined in accordance with the gain characteristic of the semiconductor optical amplifier.

SUMMARY OF THE INVENTION

An object of the present invention is to provide a wavelength converter that makes it possible to improve signal-to-noise (S/N) ratio of output signal light.

To this end, a wavelength converter according to the present invention generates output signal light which has a second wavelength in correspondence with an input signal light having a first wavelength and which carries the same information as the input signal light. The wavelength converter comprises an optical pump source for outputting optical pump light having a third wavelength; and a resonator consisting of an optical fiber and a first and second reflecting means that are disposed on both sides of the optical fiber. In the wavelength converter, the input signal light is introduced into the resonator from the first reflecting means. The optical pump light generates light having a fourth wavelength that is different from the third wavelength of the optical pump light and that is to resonate in the optical fiber between the first and second reflecting means. The output signal light is generated by a nonlinear optical phenomenon between the generated light having the fourth wavelength and the input signal light and is output from the second reflecting means.

The optical fiber may be a polarization maintaining optical fiber. An effective core area of the optical fiber may be equal to or less than 20 $\mu m^2$. A zero dispersion wavelength of the optical fiber may be substantially equal to or not more than the fourth wavelength. A cutoff wavelength of the optical fiber may be less than the fourth wavelength.

The cutoff wavelength of the optical fiber may be smaller by 13 THz or more in terms of optical frequency compared with the fourth wavelength. A reflectivity of each of the first and second reflecting means with respect to the fourth wavelength may be equal to or greater than 90%. The first and second reflecting means may each be a Bragg grating in the optical fiber. The first and second reflecting means may each be a Bragg grating in another optical fiber that is fusion-spliced with the optical fiber.

The wavelength converter of the present invention may further comprise an external optical filter disposed at the outside of the resonator and on the side of output signal light output, the external optical filter being used for blocking the generated light and transmitting the output signal light. The wavelength converter of the present invention may further comprise a wavelength property adjusting means for adjusting the reflection wavelengths of the respective first and second reflecting means. The wavelength property adjusting means may adjust the respective reflection wavelengths of the first and second reflecting means to be equal to each other. The transmission wavelength of the external optical filter can be varied, and the wavelength property adjusting means may adjust so that the transmission wavelength of the external optical filter and the wavelength of the output signal light, which changes according to the respective adjustment of the first and second reflecting means, may be equal to each other.

The wavelength converter of the present invention may further comprise an optical isolator disposed at the outside of the resonator and on the side of input signal light input, the optical isolator being used for blocking the generated light that travels in a direction opposite the direction of travel of the input signal light.

The present invention is further explained below by referring to the accompanying drawings. The drawings are provided solely for the purpose of illustration and are not intended to limit the scope of the invention.

DESCRIPTION OF THE PREFERRED EMBODIMENTS

Figure 1:
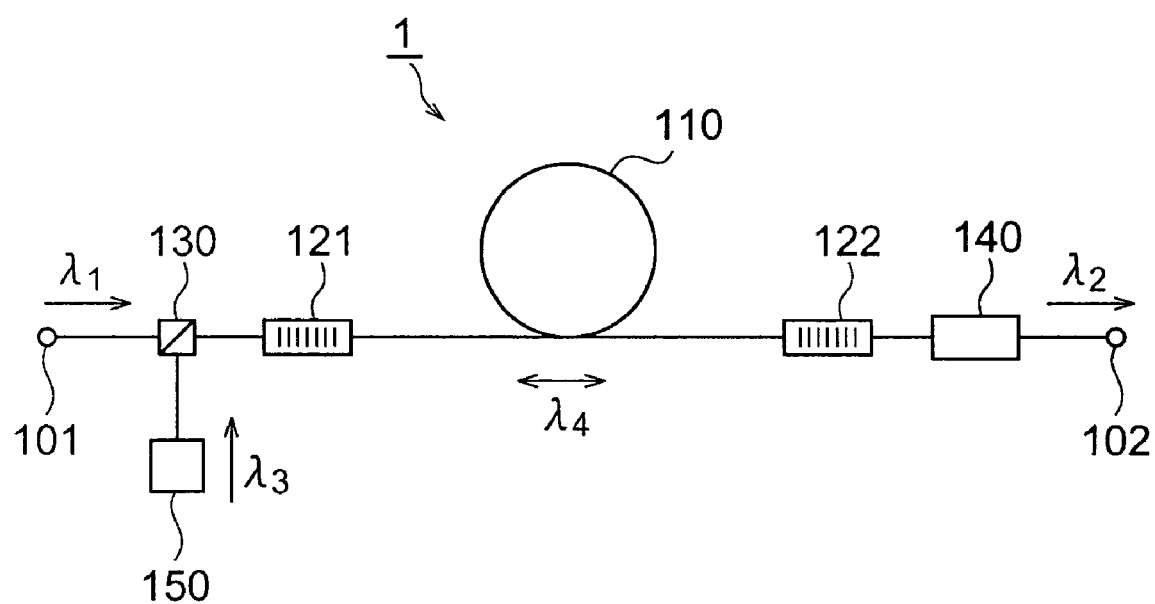
FIG. 1 is a schematic view of a wavelength converter 1 of a first embodiment.

Embodiments of the present invention are explained below by referring to the accompanying drawings. In the drawings, the same number refers to the same part to avoid duplicate explanation. The ratios of the dimensions in the drawings do not necessarily coincide with the explanation.

(First Embodiment)

A description of a wavelength converter of a first embodiment of the present invention will be given. FIG. 1 is a schematic view of a wavelength converter 1 of the first embodiment of the present invention. Input signal light $\lambda_1$ having a first wavelength $\lambda_1$ is introduced into the wavelength converter 1 from an input end 101. The wavelength converter 1 generates output signal light $\lambda_2$ having a second wavelength $\lambda_2$ that is different from the first wavelength $\lambda_1$ and carrying information that is the same as that carried by the input signal light $\lambda_1$, and outputs the output signal light $\lambda_2$ from an output end 102. The wavelength converter 1 comprises, in the direction from the input end 101 to the output end 102, an optical coupler 130, reflecting means 121, optical silica fiber 110, reflecting means 122, and external optical filter 140. It is also provided with an optical pump source 150 connected to the optical coupler 130.

The optical pump source 150 outputs optical pump light $\lambda_3$ having a third wavelength $\lambda_3$, and is, preferably, for example, a laser diode. The optical coupler 130 receives the input signal light $\lambda_1$ input from the outside to the input end 101 and the optical pump light $\lambda_3$ output from the optical pump source 150, multiplexes the input signal light $\lambda_1$ and the optical pump light $\lambda_3$, and outputs the multiplexed light to the reflecting means 121.

The reflecting means 121 and 122 are disposed at respective sides of the optical fiber 110 to form a resonator. The input signal light $\lambda_1$ and the optical pump light $\lambda_3$ that have been multiplexed by and output from the optical coupler 130 are transmitted through the reflecting means 121, and are input to the optical fiber 110. The output signal light $\lambda_2$ generated at the optical fiber 110 is transmitted through the reflecting means 122 and is input to the external optical filter 140 disposed at the outside of the resonator. Of the light generated by a nonlinear optical phenomenon by supplying the optical pump light $\lambda_3$ to the optical fiber 110, the reflecting means 121 and 122 reflect generated light $\lambda_4$ having a fourth wavelength $\lambda_4$ that is different from the wavelength of the optical pump light. In other words, the resonator causes the generated light $\lambda_4$ to resonate between the reflecting means 121 and 122.

When the optical pump light $\lambda_3$ transmitted through the reflecting means 121 and input to the resonator is guided through the optical fiber 110 disposed in the resonator, a Raman scattering phenomenon (which is a nonlinear optical phenomenon) occurs such that light including the generated light $\lambda_4$ is generated in the optical fiber 110. The generated light $\lambda_4$ of the light resonates by the operation of the resonator having the reflecting means 121 and 122 disposed on both sides of the optical fiber 110, and is optically amplified in the optical fiber 110. The optical fiber 110 also guides the input signal light $\lambda_1$ transmitted through the reflecting means 121 and input to the resonator, and generates the output signal light $\lambda_2$ by four-wave mixing (which is a nonlinear optical phenomenon) between the generated light $\lambda_4$ and the input signal light $\lambda_1$. In other words, the optical fiber 110 is used both as a light amplifying medium and a wavelength converting medium.

The external optical filter 140 is disposed at the outside of the resonator. Of the light output from the resonator through the reflecting means 122, the external optical filter 140 cuts the generated light $\lambda_4$ and transmits the output signal light $\lambda_2$.

For example, the first wavelength $\lambda_1$, the second wavelength $\lambda_2$, and the fourth wavelength $\lambda_4$ are different values near 1.55 $\mu$m. The third wavelength $\lambda_3$ is a value that allows a Raman scattering phenomenon in the optical fiber 110 to generate light having a bandwidth including the fourth wavelength $\lambda_4$. When the optical fiber 110 is a silica optical fiber, the third wavelength $\lambda_3$ is shorter than the fourth wavelength $\lambda_4$ by approximately 100 nm.

The wavelength converter 1 operates as follows. The optical pump light $\lambda_3$, which is output from the optical pump source 150, is transmitted through the reflecting means 121 via the optical coupler 130, and enters into the optical fiber 110 to travel therethrough. In the optical fiber 110 to which the optical pump light $\lambda_3$ has been supplied, nonlinear optical phenomena generate light having other wavelengths, of which the generated light $\lambda_4$ having a resonant wavelength of the resonator is optically amplified and oscillated. The input signal light $\lambda_1$ input to the input end 101 is transmitted to the reflecting means 121 through the optical coupler 130, impinges upon the optical fiber 110, and travels through the optical fiber 110. The output signal light $\lambda_2$ having a different wavelength is generated at the optical fiber 110, by a nonlinear optical phenomenon between the generated light $\lambda_4$ and the input signal light $\lambda_1$. The output signal light $\lambda_2$ generated at the optical fiber 110 passes through the reflecting means 122, is output from the resonator, passes through the external optical filter 140, and is output from the output end 102.

The output signal light $\lambda_2$ carries the same information as the input signal light $\lambda_1$, that has been input, and has a wavelength that is different from the wavelength of the input signal light $\lambda_1$. The wavelength converter 1 generates the output signal light $\lambda_2$ through the generated light $\lambda_4$. The generated light $\lambda_4$ is a portion, resonated by the resonator, of the Raman scattered light and has a narrow bandwidth. Therefore, the S/N ratio of the output signal light $\lambda_2$ is very good.

Light having a longer wavelength band than the optical pump light can be amplified by a Raman scattering phenomenon and the wavelength band depends upon the optical pump light wavelength. Therefore, by choosing the optical pump light wavelength, the wavelength band of signal light can be changed without changing the fiber. If the reflection wavelengths of the light reflecting means 121 and 122 are changed, the wavelength of the generated light $\lambda_4$ also can be easily changed, so the variable range of the wavelength $\lambda_4$ is relatively wider than in a conventional wavelength converter.

Since the wavelength converter 1 makes use of a nonlinear optical phenomenon at the optical fiber 110, the highest possible nonlinearity of the optical fiber 110 is preferable. If the effective core area of the optical fiber 110 is equal to or less than 20 $\mu$m$^2$, the generation efficiency of the generated light $\lambda_4$, with respect to the power of the optical pump light $\lambda_3$ is very good, and the generation efficiency of the output signal light $\lambda_2$ with respect to the power of the generated light $\lambda_4$ is very good. In other words, the input signal light $\lambda_1$ is converted into the output signal light $\lambda_2$ with high efficiency.

Figure 2:
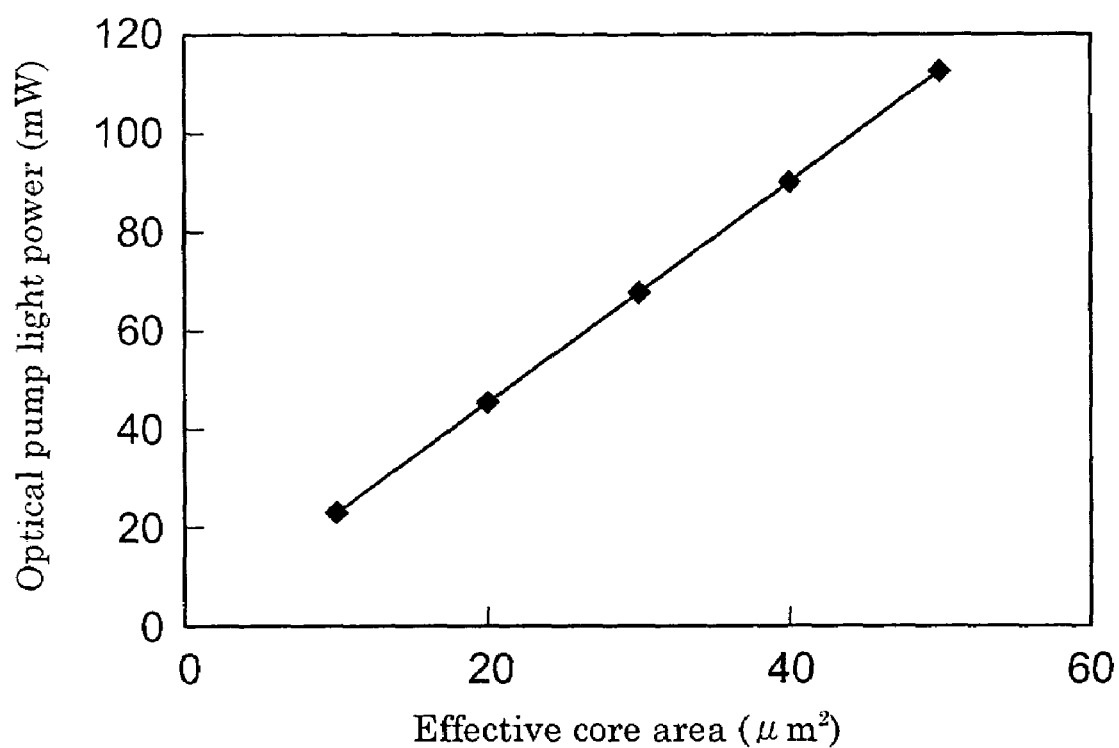
FIG. 2 is a graph showing the relationship between the effective core area of an optical fiber 110 and the required optical pump light power.

FIG. 2 is a graph illustrating the relationship between the effective core area of the optical fiber 110 and the optical pump light power that is required to match the power of the output signal light $\lambda_2$ with the power of the input signal light $\lambda_1$. Here, such required power of the optical pump light $\lambda_3$ was determined in the case where the input signal light $\lambda_1$ and the optical pump light $\lambda_3$ travel in the same direction through the optical fiber 110 as illustrated in FIG. 1. As shown in the graph, the smaller the effective core area of the optical fiber 110, the smaller the required optical pump light power. If the effective core area of the optical fiber 110 is equal to or less than 20 $\mu m^2$, the required optical pump light power is equal to or less than 50 mW. This is very desirable because of the availability of a laser diode that outputs optical pump light having such a power.

Since the wavelength converter 1 makes use of a nonlinear optical phenomenon at the optical fiber 110, it is desirable that the respective lights having different wavelengths travel through the optical fiber 110 in the same polarization direction, and that the optical fiber 110 be a polarization maintaining optical fiber. In this case, if the optical pump light $\lambda_3$ and the input signal light $\lambda_1$ which enter the optical fiber 110 have the same polarization direction, light $\lambda_4$ having the same polarization direction is generated, so the output signal light $\lambda_2$ is generated with high efficiency by the nonlinear optical phenomenon between the generated light $\lambda_4$ and the input signal light $\lambda_1$ both having the same polarization direction. In other words, the input signal light $\lambda_1$ is converted into the output signal light $\lambda_2$ with high efficiency.

Since the wavelength converter 1 makes use of four-wave mixing at the optical fiber 110, it is desirable that a zero dispersion wavelength $\lambda_0$ of the optical fiber 110 be substantially equal to the wavelength $\lambda_4$ of the generated light. In this case, the output signal $\lambda_2$ is generated with high efficiency by the nonlinear optical phenomenon between the generated light $\lambda_4$ and the input signal light $\lambda_1$. When the first wavelength $\lambda_1$ and the second wavelength $\lambda_2$ are values near 1.55 $\mu$m, a dispersion-shifted optical fiber having a zero dispersion wavelength near 1.55 $\mu$m is suitable as the optical fiber 110.

In the wavelength converter 1, the zero dispersion wavelength $\lambda_0$ of the optical fiber 110 is also desirably equal to or less than the wavelength $\lambda_4$ of the generated light. In general, when the power of the generated light $\lambda_4$ is large, the wavelength that meets phase matching conditions during four-wave mixing is shifted towards a wavelength that is longer than the zero dispersion wavelength $\lambda_0$. Therefore, if the zero dispersion wavelength $\lambda_0$ of the optical fiber 110 is equal to or less than the wavelength $\lambda_4$ of the generated light, the output signal light $\lambda_2$ is generated with high efficiency.

Since the wavelength converter 1 makes use of a Raman scattering phenomenon at the optical fiber 110, it is desirable that the cutoff wavelength of the optical fiber 110 be more than the wavelength $\lambda_4$ of the generated light by 13 THz or greater in terms of optical frequency. In this case, since the optical pump light $\lambda_3$ travels in a single mode through the optical fiber 110, the generated light $\lambda_4$ is generated with high efficiency, and accordingly the output signal light $\lambda_2$ is generated with high efficiency.

Figure 3:
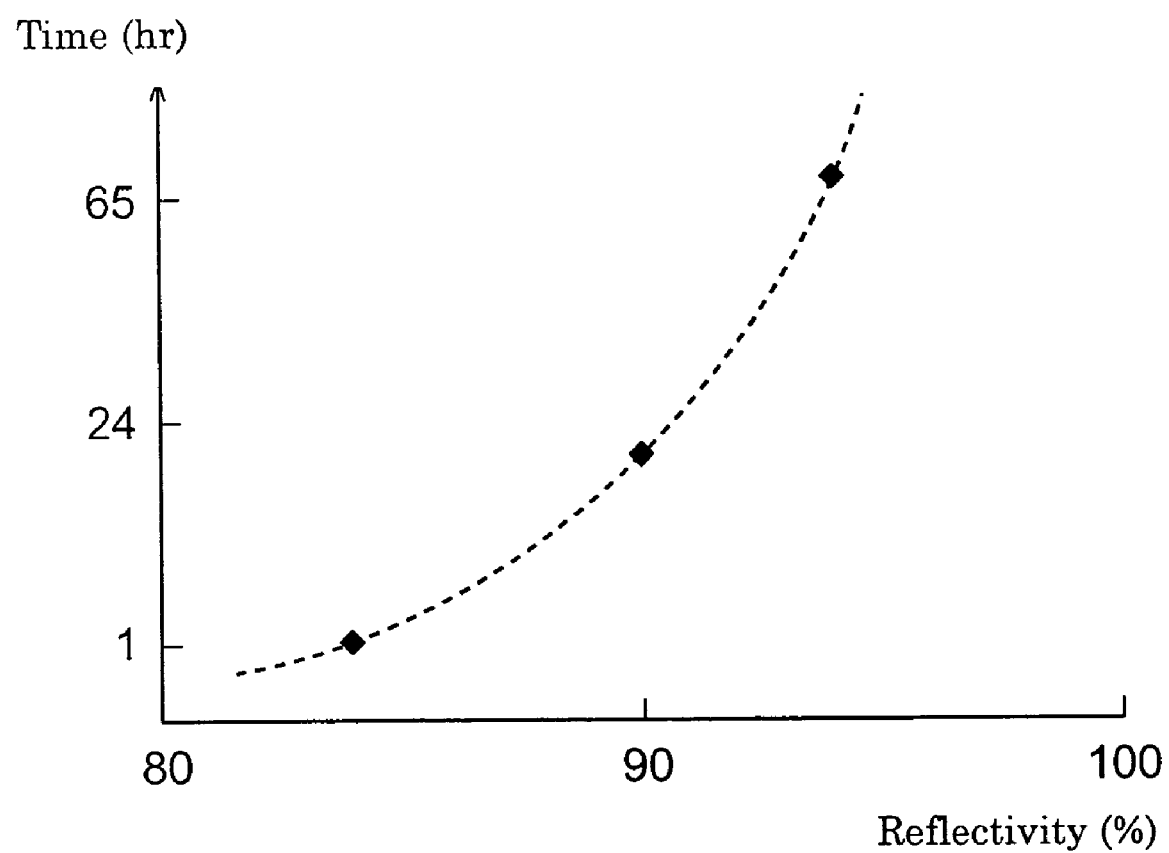
FIG. 3 is a graph showing the relationship between the continuous oscillation time and the reflectivity of reflecting means 121 and 122 with respect to a fourth wavelength $\lambda_4$.

In the wavelength converter 1, the reflectivity of each of the reflecting means 121 and 122 with respect to the fourth wavelength $\lambda_4$ may be desirably equal to or greater than 90%. In this case, the light $\lambda_4$ generated by supplying the optical pump light $\lambda_3$ to the optical fiber 110 is oscillated with high efficiency, whereby the generated light $\lambda_4$ having high power is obtained. Therefore, the input signal light $\lambda_1$ is converted into the output signal light $\lambda_2$ with high efficiency. FIG. 3 is a graph showing the relationship between the continuous oscillation time and the reflectivity of the reflecting means 121 and 122 with respect to the fourth wavelength $\lambda_4$. As shown in the graph, the larger the reflectivity of each of the reflecting means 121 and 122 with respect to the fourth wavelength $\lambda_4$, the longer the continuous oscillation time. Accordingly, if the reflectivity is equal to or greater than 90%, the continuous oscillation time is equal to or greater than 24 hours.

It is desirable that the reflecting means 121 and 122 of the wavelength converter 1 be Bragg gratings formed in the optical fiber 110. In this case, low loss of the resonator can be obtained, and the structure is simple. The reflecting means 121 and 122 may also desirably be a Bragg grating formed in another optical fiber fusion-spliced to the optical fiber 110. In this case, the reflecting means 121 and 122 are easy to produce, yield can be increased, and loss of the resonator can be kept small by the fusion-splicing. It is also desirable that the external optical filter 140 of the wavelength converter 1 be a Bragg grating formed in the optical fiber.

In the wavelength converter 1, it is desirable that, of the light output from the resonator by the reflecting means 122, the external optical filter 140 block the generated light $\lambda_4$ and transmit the output signal light $\lambda_2$. In this case, high quality signal light transmission is possible without outputting the generated light $\lambda_4$ from the output end 102.

(Second Embodiment)

Figure 4:
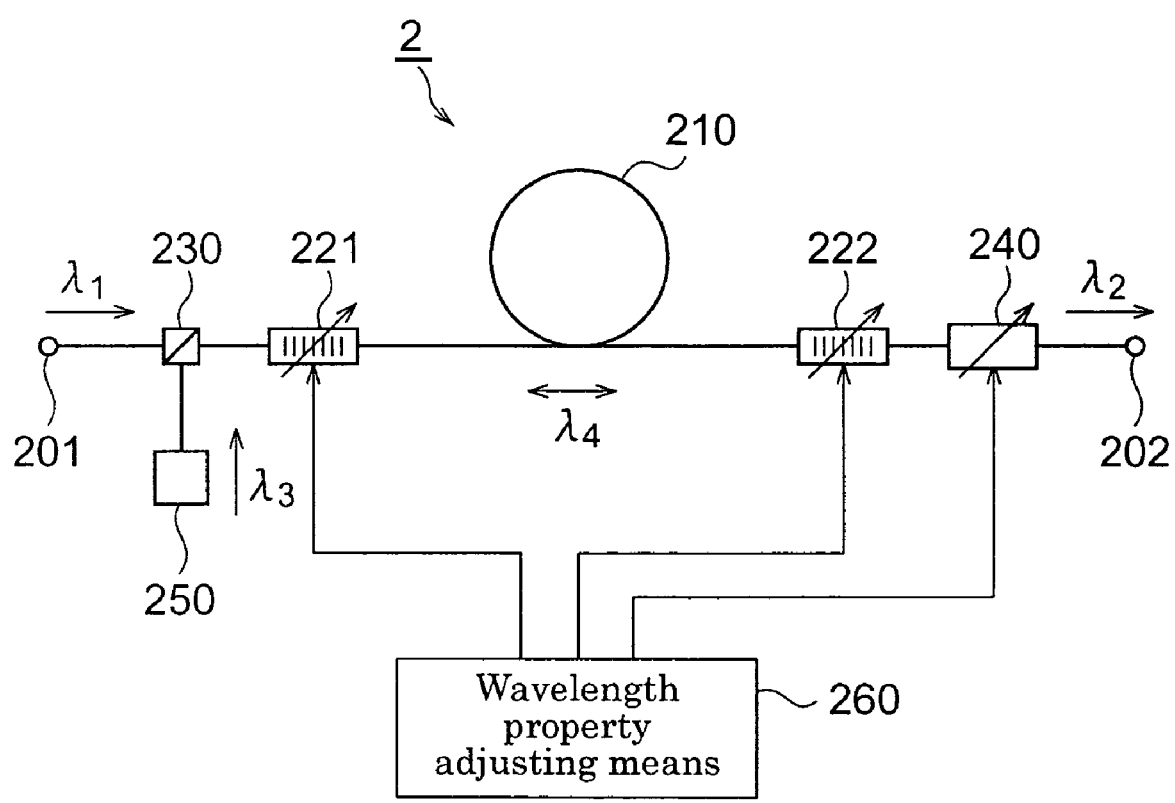
FIG. 4 is a schematic view of a wavelength converter 2 of a second embodiment.

Next, a description of a wavelength converter of a second embodiment of the present invention will be given. FIG. 4 is a schematic view of a wavelength converter 2 of the second embodiment. The wavelength converter 2 receives input signal light $\lambda_1$ from an input end 201, generates output signal light $\lambda_2$ having a wavelength that is different from the wavelength of the input signal light $\lambda_1$ and carrying the same information as the input signal light $\lambda_1$, and outputs the output signal light $\lambda_2$ from an output end 202. The wavelength converter 2 comprises an optical coupler 230, a reflecting means 221, a silica optical fiber 210, a reflecting means 222, and an external filter 240 in the direction from the input end 201 to the output end 202. It also comprises an optical pump source 250 connected to the optical coupler 230, and wavelength property adjusting means 260.

The optical fiber 210, the optical coupler 230, and the optical pump source 250 of the wavelength converter 2 are similar to the optical fiber 110, the optical coupler 130, and the optical pump source 150 of the wavelength converter 1, respectively. The reflecting means 221 and 222 are different from the reflecting means 121 and 122 in that the reflection wavelengths of the reflecting means 221 and 222 are variable. The external optical filter 240 is different from the external optical filter 140 of the wavelength converter 1 in that the transmission wavelength of the external optical filter 240 is variable. Unlike the reflecting means 121 and 122 and the external optical filter 140, the reflecting means 221 and 222 and the external optical filter 240 have the wavelength property adjusting means 260 connected thereto.

The reflecting means 221 and 222, whose reflection wavelengths are variable, are Bragg gratings formed in either the optical fiber 210 or another optical fiber. It is desirable that their reflection wavelengths be variable by adjustment of the tension or temperature. The external optical filter 240, whose transmission wavelength is variable, is a Bragg grating formed in the optical fiber. It is desirable that the transmission wavelength be variable by adjustment of the tension or temperature.

The wavelength property adjusting means 260 adjusts the reflection wavelengths of the reflecting means 221 and 222. Here, it is desirable that the wavelength property adjusting means 260 adjust the respective reflection wavelengths of the reflecting means 221 and 222 to be equal to each other. The wavelength property adjusting means 260 also adjusts the transmission wavelength of the external optical filter 240. Here, it is desirable that the reflection wavelengths of the reflecting means 221 and 222 be adjusted to be equal to each other, and that the transmission wavelength of the external optical filter 240 and the wavelength of the output signal light that changes with this adjustment be adjusted to be equal each other. In this case, since the transmission wavelength of the external optical filter 240 follows changes caused in the wavelength of the output signal light by changes in the wavelength of the generated light, it is possible to prevent a reduction in the power of the output signal light.

The wavelength converter 2 operates in the same way as the wavelength converter 1. However, since the reflection wavelength of the reflecting means 221 and 222 is variable, the resonant wavelength (wavelength $\lambda_4$ of the generated light) of the resonator comprising the reflecting means 221 and 222 is variable accordingly. Therefore, the wavelength $\lambda_2$ of the output signal light is also variable.

Adjusting the reflection wavelengths of the reflecting means 221 and 222 to be equal to each other by the wavelength property adjusting means stabilizes the oscillation of the resonator comprising the reflecting means 221 and 222. Adjusting the transmission wavelength of the external optical filter 240 by the wavelength property adjusting means 260 in addition to the adjustment of the reflection wavelengths of the reflecting means 221 and 222 allows the transmission wavelength of the external optical filter 240 to follow changes in the wavelength of the output signal light caused by changes in the wavelength of the generated light. Therefore, it is possible to prevent a reduction in the power of the output signal light.

For example, in the case where a dispersion-shifted optical fiber having a zero dispersion wavelength near 1.55 $\mu$m is used as the optical fiber 210, which has a transmission loss of 0.2 dB/km at a wavelength of 1.55 $\mu$m, a length of 5 km, and an effective core area of 50 $\mu$m$^2$, the spectral width of the output signal light $\lambda_2$ (i.e., wavelength width for a power that is reduced by 3 dB from the peak power) is approximately 7 nm. This spectral width is equal to or greater than three times the spectral width in the case where a standard single mode optical fiber is used as the optical fiber 210.

(Third Embodiment)

Figure 5:
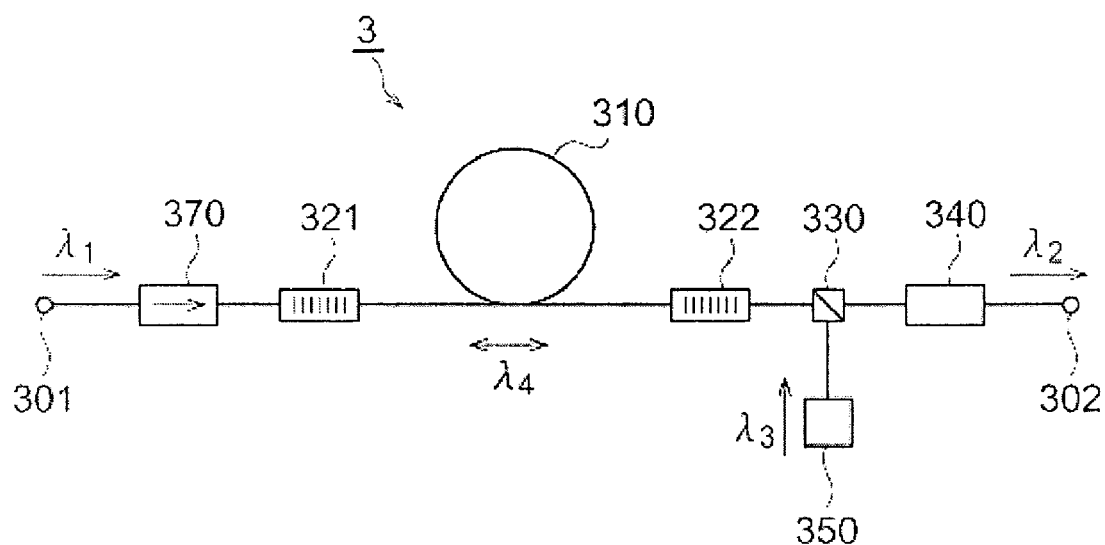
FIG. 5 is a schematic view of a wavelength converter 3 of a third embodiment.

Next, a description of a wavelength converter of a third embodiment of the present invention will be given. FIG. 5 is a schematic view of a wavelength converter 3 of the third embodiment. The wavelength converter 3 receives input signal light $\lambda_1$ from an input end 301, generates output signal light $\lambda_2$ having a wavelength that is different from the wavelength of the input signal light $\lambda_1$ and carrying the same information as the input signal light $\lambda_1$, and outputs the output signal light $\lambda_2$ from the output end 302. The wavelength converter 3 comprises an optical isolator 370, reflecting means 321, silica optical fiber 310, reflecting means 322, optical coupler 330, and external filter 340 in the direction from the input end 301 to the output end 302. It is also provided with an optical pump source 350 connected to the optical coupler 330.

The optical fiber 310, the reflecting means 321 and 322, and the optical pump source 350 of the wavelength converter 3 are similar to the optical fiber 110, the reflecting means 121 and 122, and the optical pump source 150 of the wavelength converter 1, respectively. The wavelength converter 3 differs from the wavelength converter 1 in that the optical coupler 330 is disposed between the reflecting means 322 and the external optical filter 340, and that the wavelength converter 3 further comprises the optical isolator 370.

The optical coupler 330 outputs to the external optical filter 340 the output signal light $\lambda_2$ that has been output from the reflecting means 322, and outputs to the reflecting means 322 optical pump light $\lambda_3$ that has been output from the optical pump source 350. In other words, in the embodiment, the optical pump light $\lambda_3$ is supplied in the opposite direction relative to the signal light.

The optical isolator 370 is disposed at the outside of a resonator comprising the reflecting means 321 and 322 and on the side of input signal light $\lambda_1$ input. The optical isolator 370 transmits the input signal light $\lambda_1$ traveling towards the reflecting means 321 from the input end 301, but blocks light traveling in the opposite direction. In particular, the optical isolator 370 blocks generated light $\lambda_4$ traveling in a direction opposite the direction of travel of the input light signal $\lambda_1$.

The wavelength converter 3 operates as follows. The optical pump light $\lambda_3$ output from the optical pump source 350 passes through the reflecting means 322 via the optical coupler 330, enters the optical fiber 310, and travels through the optical fiber 310. Light having other wavelengths is generated by a Raman scattering phenomenon at the optical fiber 310 to which the optical pump light $\lambda_3$ has been supplied. Of the light, the generated light $\lambda_4$ having a resonant wavelength of the resonator is optically amplified and oscillated. The input signal light $\lambda_1$ input to the input end 301 is transmitted through the reflecting means 321 via the optical isolator 370, enters the optical fiber 310, and travels through the optical fiber 310. At the optical fiber 310, the output signal light $\lambda_2$ having a different wavelength is generated by four-wave mixing between the generated light $\lambda_4$ and the input signal light $\lambda_1$. The output signal light $\lambda_2$ generated at the optical fiber 310 passes through the reflecting means 322, is output from the resonator, passes through the optical coupler 330 and the external optical filter 340, and is output from the output end 302.

The output signal light $\lambda_2$ that has been output carries the same information as the input signal light $\lambda_1$ that has been input and has a wavelength that is different from the wavelength of the input signal light $\lambda_1$. The wavelength converter 3 utilizes, as the generated light $\lambda_4$, light having a wavelength that is generated by a Raman scattering phenomenon and is resonated by the resonator. The bandwidth of the generated light $\lambda_4$ is therefore narrow, and the S/N ratio of the output signal light $\lambda_2$ is very good. In this embodiment, since light traveling in a direction opposite to the signal light transmission direction is blocked by the optical isolator 370, the oscillation of the resonator comprising the reflecting means 321 and 322 becomes stable, and high quality signal light transmission is achieved.

For example, assume a case where a highly non-linear optical fiber is used as the optical fiber 310, which has a zero dispersion wavelength of 1549 nm, a length of 3 km, and an effective core area of 10 $\mu$m$^2$, and which enables light to travel while maintaining the polarization of the light. The first wavelength $\lambda_1$ is 1545 nm, the third wavelength $\lambda_3$ is 1450 nm, and the fourth wavelength $\lambda_4$ is 1550 nm. When the power of the optical pump light $\lambda_3$ is equal to or greater than 20 dBm, the power of the output signal light $\lambda_2$ is large, and parametric amplification occurs. Since the optical fiber 310 is a polarization maintaining optical fiber, the power of the output signal light $\lambda_2$ is high as compared to the case where the polarization is not maintained and the zero dispersion wavelength is 1550 nm.

The optical isolator may be disposed at the output side, such as directly in front of or behind the external optical filter 340. In addition, optical isolators may be disposed at both the input and output sides. An optical isolator may be similarly used in the first and second embodiments.

(Fourth and Fifth Embodiment)

Figure 6:
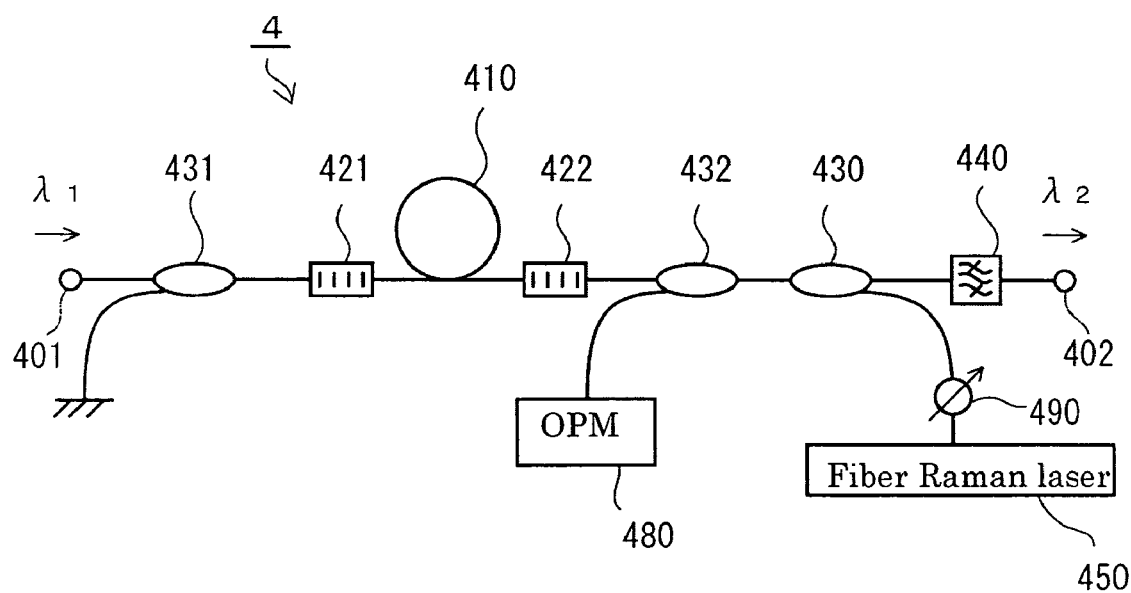
FIG. 6 is a schematic view of a wavelength converter 4 of forth and fifth embodiments.

A description of a wavelength converter of forth and fifth embodiments of the present invention will be given. FIG. 6 is a schematic view of a wavelength converter 4 of the forth and fifth embodiment. The wavelength converter 4 receives input signal light $\lambda_1$ from an input end 401, generates output signal light $\lambda_2$ having a wavelength that is different from the wavelength of the input signal light $\lambda_1$ and carrying the same information as the input signal light $\lambda_1$, and outputs the output signal light $\lambda_2$ from the output end 402. The wavelength converter 4 comprises an optical coupler 431, reflecting means 421, silica optical fiber 410, reflecting means 422, optical couplers 432 and 430, and external filter 440 in the direction from the input end 401 to the output end 402. It is also provided with an optical pump source 450 connected to the optical coupler 430 via a tunable attenuator 490 and optical power monitor 480 connected to the optical coupler 432.

The optical fiber 410 is similar to the optical fiber 310 of the wavelength converter 3. The optical fiber 410 may be a high non-linear dispersion shifted optical fiber whose zero dispersion wavelength is shifted to the wavelength $\lambda_4$ of the generated light $\lambda_4$, a high non-linear dispersion flatted optical fiber whose dispersion slope is extremely small at $\lambda_4$, or a high non-linear photonic crystal optical fiber. These three optical fibers have desirably a non-linear coefficient $\gamma$ not less than 10 $W^{-1}$ $km^{-1}$, for example, at the wavelength $\lambda_4$.

The optical pump source 450 is a fiber Raman laser. The reflecting means 421 and 422 and optical coupler 430 are similar to the reflecting means 321 and 322 and optical coupler 330 of the wavelength converter 3, respectively.

The wavelength converter 4 differs from the wavelength converter 3 in that the optical coupler 431 is disposed instead of the optical isolator 370 of the wavelength converter 3, and that the wavelength converter 4 further comprises the optical coupler 432, the optical power meter 480, and the tunable attenuator 490.

The optical coupler 431 is a WDM coupler. It transmits the input signal light $\lambda_1$ traveling towards the reflecting means 421 from the input end 401, but blocks pump light $\lambda_3$ and generated light $\lambda_4$ traveling in a direction opposite the direction of travel of the input signal $\lambda_1$.

The optical coupler 432 is a tap coupler and divides about 1% of the power of the optical pump light $\lambda_3$ to the optical power meter 480. The optical power meter 480 monitors the power of the optical pump light $\lambda_3$.

Figure 7:
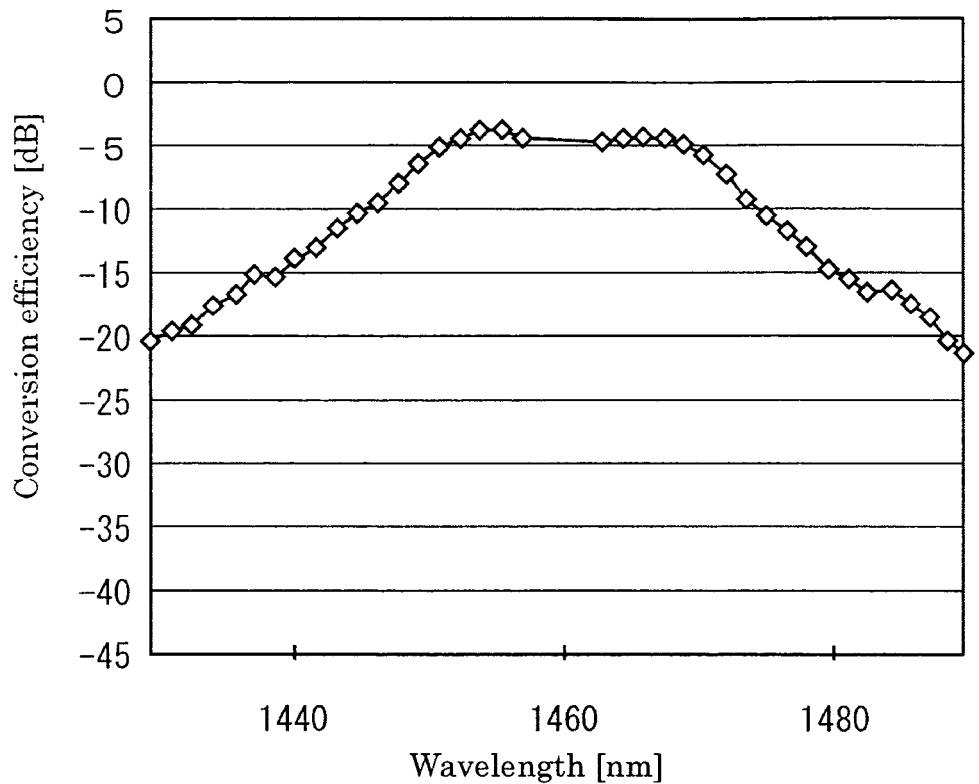
FIG. 7 is a graph showing a conversion efficiency of the wavelength converter 4 according to forth embodiment.

For example, assume a case (Forth example) where an optical pump source 450 is a fiber Raman laser output a optical pump light $\lambda_3$ whose wavelength is 1370 nm. An optical fiber 410 has a zero dispersion wavelength of 1460 nm and a length of 500 m. Its transmission loss is 0.8 dB/km, dispersion slope is 0.03 ps/nm/km, non-linear coefficient is 21 $W_{0.5}^{-1}km^{-1}$, and polarization mode dispersion is 0.03 ps/km$^{0.5}$ respectively at the wavelength of 1460 nm. The fourth wavelength $\lambda_4$ is set to be 1460 nm by reflecting means 421 and 422. The conversion efficiency of the wavelength converter 4 according to the forth embodiment is shown in FIG. 7.

Figure 8:
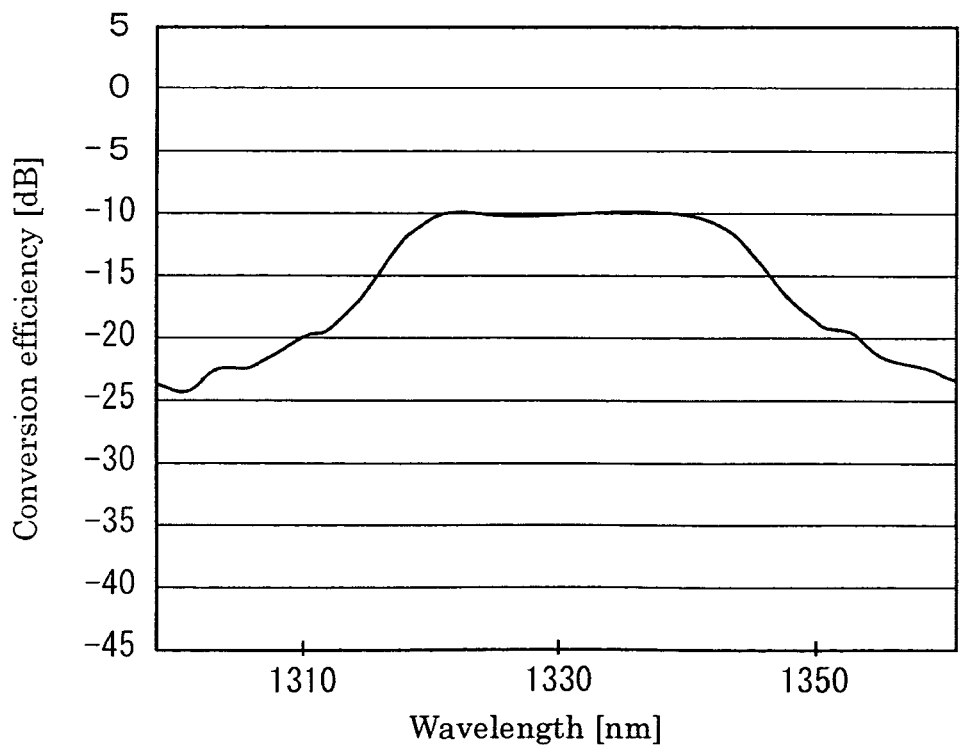
FIG. 8 is a graph showing a conversion efficiency of the wavelength converter 4 according to fifth embodiment.

Further, assume a case (Fifth example) where an optical pump source 450 is a fiber Raman laser output a optical pump light $\lambda_3$ whose wavelength is 1250 nm. An optical fiber 410 has a zero dispersion wavelength of 1330 nm and a length of 500 m. Its transmission loss is 1.3 dB/km, dispersion slope is 0.08 ps/nm/km, non-linear coefficient is 6 $W^{-1}$ $km^{-1}$, and polarization mode dispersion is 0.1 ps/km$^{0.5}$ respectively at the wavelength of 1330 nm. The fourth wavelength $\lambda_4$ is set to be 1330 nm by reflecting means 421 and 422. The conversion efficiency of the wavelength converter 4 according to the forth embodiment is shown in FIG. 8.

The output signal light $\lambda_2$ that has been output carries the same information as the input signal light $\lambda_1$ that has been input, and has a wavelength that is different from the wavelength of the input signal light $\lambda_1$. The wavelength converter 4 utilizes, as the generated light $\lambda_4$, light having a wavelength that is generated by a Raman scattering phenomenon and is resonated by the resonator. The bandwidth of the generated light $\lambda_4$ is therefore narrow, and the S/N ratio of the output signal light $\lambda_2$ is very good. In this embodiment, since light traveling in a direction opposite to the signal light transmission direction is blocked by the optical coupler 431, the oscillation of the resonator comprising the reflecting means 421 and 422 becomes stable, and high quality signal light transmission is achieved.

The entire disclosure of Japanese Patent Application No. 2002-251627 filed on Aug. 29, 2002 including the specification, claims, drawings, and summary are incorporated herein by reference in its entirety.

What is claimed is:

1. A wavelength converter for generating output signal light in correspondence with input signal light, the input signal light having a first wavelength, and the output signal light having a second wavelength and carrying the same information as the input signal light, the wavelength converter comprising:

an optical pump source for outputting optical pump light having a third wavelength; and a resonator comprising an optical fiber and a first and second reflecting means, the first and second reflecting means being disposed on both sides of the optical fiber;

wherein the input signal light is introduced into the resonator from the first reflecting means, and due to Raman scattering phenomenon, the optical pump light generates light having a fourth wavelength that is different from the third wavelength of the optical pump light and resonating in the optical fiber between the first and second reflecting means, and the output signal light is generated by a nonlinear optical phenomenon between the generated light having the fourth wavelength and the input signal light and is output from the second reflecting means.

2. A wavelength converter according to claim 1, wherein an effective core area of the optical fiber is equal to or less than 20 $\mu$m.

3. A wavelength converter according to claim 1, wherein the optical fiber is a polarization maintaining optical fiber.

4. A wavelength converter according to claim 1, wherein a zero dispersion wavelength of the optical fiber is substantially equal to the fourth wavelength.

5. A wavelength converter according to claim 1, wherein a zero dispersion wavelength of the optical fiber is not more than the fourth wavelength.

6. A wavelength converter according to claim 1, wherein a cutoff wavelength of the optical fiber is less than the fourth wavelength.

7. A wavelength converter according to claim 1, wherein a cutoff wavelength of the optical fiber is less than the fourth wavelength by a value corresponding to an optical frequency equal to or greater than 13 THz.

8. A wavelength converter according to claim 1, wherein a reflectivity of each of the first and second reflecting means with respect to the fourth wavelength is equal to or greater than 90%.

9. A wavelength converter according to claim 1, wherein the first and second reflecting means are Bragg gratings in an optical fiber.

10. A wavelength converter according to claim 1, wherein the first and second reflecting means are Bragg gratings in other optical fibers that are fusion-spliced with the optical fiber.

11. A wavelength converter according to claim 1, further comprising an external optical filter disposed at the outside of the resonator and on the side of output signal light output, the external optical filter blocking the generated light and transmitting the output signal light.

12. A wavelength converter according to claim 1, further comprising a wavelength property adjusting means for adjusting the respective reflection wavelengths of the first and second reflecting means.

13. A wavelength converter according to claim 12, wherein the wavelength property adjusting means adjusts the respective reflection wavelengths of the first and second reflecting means to be equal to each other.

14. A wavelength converter according to claim 13, further comprising an external optical filter disposed at the outside of the resonator and on the side of output signal light output, the external optical filter blocking the generated light and transmitting the output signal light, the transmission wavelength of the external optical filter being variable, wherein the wavelength property adjusting means adjusts the transmission wavelength of the external optical filter to be equal to the wavelength of the output signal light that changes according to the adjustment of the respective reflection wavelengths of the first and second reflecting means.

15. A wavelength converter according to claim 1, further comprising an optical isolator disposed at the outside of the resonator and on the side of input signal light input, the optical isolator blocking the generated light that travels in a direction opposite the direction of travel of the input signal light.

16. A wavelength converter according to claim 1, further comprising an optical isolator disposed at the outside of the resonator and on the side of output signal light output, the optical isolator blocking light that travels in a direction opposite the direction of travel of the output signal light.

17. A wavelength converter according to claim 1, wherein the nonlinear optical phenomenon is four-wave mixing.

* * * * *